(12) United States Patent
Lee et al.

(10) Patent No.: US 11,411,432 B2
(45) Date of Patent: Aug. 9, 2022

(54) METHOD FOR DISABLING WIRELESS POWER RECEPTION CIRCUIT ON BASIS OF STATE OF ELECTRONIC DEVICE, AND ELECTRONIC DEVICE THEREOF

(71) Applicant: Samsung Electronics Co., Ltd., Gyeonggi-do (KR)

(72) Inventors: Ju-Hyang Lee, Gyeonggi-do (KR); Yusu Kim, Gyeonggi-do (KR); Kyungmin Park, Gyeonggi-do (KR); Wooram Lee, Gyeonggi-do (KR); Jung-Min Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 16/754,412

(22) PCT Filed: Oct. 1, 2018

(86) PCT No.: PCT/KR2018/011612
§ 371 (c)(1),
(2) Date: Apr. 8, 2020

(87) PCT Pub. No.: WO2019/078511
PCT Pub. Date: Apr. 25, 2019

(65) Prior Publication Data
US 2020/0313460 A1    Oct. 1, 2020

(30) Foreign Application Priority Data
Oct. 16, 2017 (KR) .................. 10-2017-0134281

(51) Int. Cl.
*H02J 50/10* (2016.01)
*H02J 50/80* (2016.01)
(Continued)

(52) U.S. Cl.
CPC .............. *H02J 50/10* (2016.02); *G01K 1/024* (2013.01); *H02J 7/02* (2013.01); *H02J 50/80* (2016.02)

(58) Field of Classification Search
CPC .. H02J 50/10; H02J 50/80; H02J 7/02; G01K 1/024
(Continued)

(56) References Cited

U.S. PATENT DOCUMENTS 9,030,421 B2 * 5/2015 Tseng .................... G06F 3/0418
                                                                     320/108
9,859,797 B1 * 1/2018 Leabman .............. H02M 7/217
(Continued)

FOREIGN PATENT DOCUMENTS

JP         5556002 B2      7/2014
JP      2015-111996 A      6/2015
(Continued)

OTHER PUBLICATIONS

Korean Search Report dated Sep. 27, 2021.
Notice of Patent Grant dated May 23, 2022.

*Primary Examiner* — Alfonso Perez Borroto
(74) *Attorney, Agent, or Firm* — Cha & Reiter, LLC

(57) ABSTRACT

An electronic device according to various embodiments of the present invention comprises a wireless power reception circuit and a processor, wherein the processor can be set so as to receive power transmitted from an external electronic device by using the wireless power reception circuit, detect a state related with the reception during the reception of the power, and disable at least a part of the wireless power reception circuit such that the external electronic device stops the transmission when the state satisfies a designated condition. Other examples are also possible.

11 Claims, 8 Drawing Sheets

(51) Int. Cl.
*G01K 1/024* (2021.01)
*H02J 7/02* (2016.01)

(58) Field of Classification Search
USPC .......................................... 307/104
See application file for complete search history.

(56) References Cited

U.S. PATENT DOCUMENTS

| | | | |
|---|---|---|---|
| 9,939,864 B1* | 4/2018 | Bell | H04L 12/4625 |
| 10,511,183 B2* | 12/2019 | Pan | H02J 50/90 |
| 2014/0306646 A1* | 10/2014 | Liu | H02J 50/10 |
| | | | 320/108 |
| 2014/0306657 A1 | 10/2014 | Lundgren et al. | |
| 2015/0115728 A1 | 4/2015 | Yammamoto et al. | |
| 2016/0204642 A1* | 7/2016 | Oh | H02J 7/007 |
| | | | 320/108 |
| 2017/0047769 A1 | 2/2017 | Kim et al. | |
| 2017/0133889 A1* | 5/2017 | Yeo | H02J 50/80 |
| 2017/0207657 A1 | 7/2017 | Kotani | |
| 2018/0212470 A1 | 7/2018 | Leem | |

FOREIGN PATENT DOCUMENTS

| | | |
|---|---|---|
| JP | 2017-131020 A | 7/2017 |
| KR | 10-2011-0068007 A | 6/2011 |
| KR | 10-2015-0019227 A | 2/2015 |
| KR | 10-2015-0096858 A | 8/2015 |
| KR | 10-2016-0023964 A | 3/2016 |
| KR | 10-2017-0020147 A | 2/2017 |
| KR | 10-2017-0023523 A | 3/2017 |

* cited by examiner

METHOD FOR DISABLING WIRELESS POWER RECEPTION CIRCUIT ON BASIS OF STATE OF ELECTRONIC DEVICE, AND ELECTRONIC DEVICE THEREOF

CROSS REFERENCE TO RELATED APPLICATIONS

This application is a National Phase Entry of PCT International Application No. PCT/KR2018/011612, which was filed on Oct. 1, 2018 and claims a priority to Korean Patent Application No. 10-2017-0134281, which was filed on Oct. 16, 2017, the contents of which are incorporated herein by reference.

TECHNICAL FIELD

The disclosure relates to the state of an electronic device, and more particularly to a method of deactivating a wireless power reception circuit and an electronic device therefor.

BACKGROUND ART

Recently, wireless charging technology that uses an electromagnetic induction scheme or a magnetic resonance scheme is being applied to electronic devices such as smartphones. If a power transmitting unit (PTU) (e.g., a wireless charging pad) and a power receiving unit (PRU) (e.g., a smartphone) are brought within a predetermined distance of each other, electromagnetic induction or resonance may occur between a transmission coil of the power transmitting unit and a reception coil of the power receiving unit, and the battery of the power receiving unit may be charged. Accordingly, users of electronic devices may charge electronic devices more conveniently compared to conventionally used wired charging technology that performs charging by connecting a charging terminal.

DISCLOSURE OF INVENTION

Technical Problem

If the battery of an electronic device is charged using a wireless charging method, heat may be generated by wireless charging. If heat above a predetermined level is generated due to wireless charging, at least some components of the electronic device may be damaged by the generated heat.

To solve the above-described drawbacks, various embodiments of the disclosure provide a wireless charging method and apparatus capable of decreasing the amount of heat generated during wireless charging.

Solution to Problem

According to various embodiments, an electronic device includes a wireless power reception circuit and a processor, wherein the processor is configured to receive power transmitted from an external electronic device using the wireless power reception circuit, detect a state related to the reception while receiving the power, and when the state satisfies a designated condition, deactivate at least a part of the wireless power reception circuit so that the external electronic device suspends transmission.

According to various embodiments, an electronic device, includes a wireless power reception circuit, a temperature sensor, and a processor, wherein the processor is configured to receive power from an external electronic device using the wireless power reception circuit, sense the temperature of at least a part of the electronic device using the temperature sensor while receiving the power, identify a state related to the reception, based at least on the temperature, and if the state satisfies the designated condition, deactivate at least a part of the wireless power reception circuit.

According to various embodiments, an electronic device, includes: a temperature sensor configured to sense the temperature of at least a part of the electronic device; a wireless power reception circuit configured to receive power from an external electronic device; a detection circuit configured to identify a signal, provided from the external electronic device, to the power reception circuit so as to determine the state of the external electronic device; and a processor, wherein the processor is configured to: deactivate at least a part of the wireless power reception circuit if temperature information received from the temperature sensor and state information received from the detection circuit satisfy a designated first condition; and activate at least a part of the wireless power reception circuit if the temperature information and the state information satisfy a designated second condition.

Advantageous Effects of Invention

According to various embodiments, the wireless charging function of an electronic device may be restricted by taking into consideration the state of the electronic device during wireless charging, and the amount of heat generated during wireless charging can be decreased.

BEST MODE FOR CARRYING OUT THE INVENTION

Figure 1A:
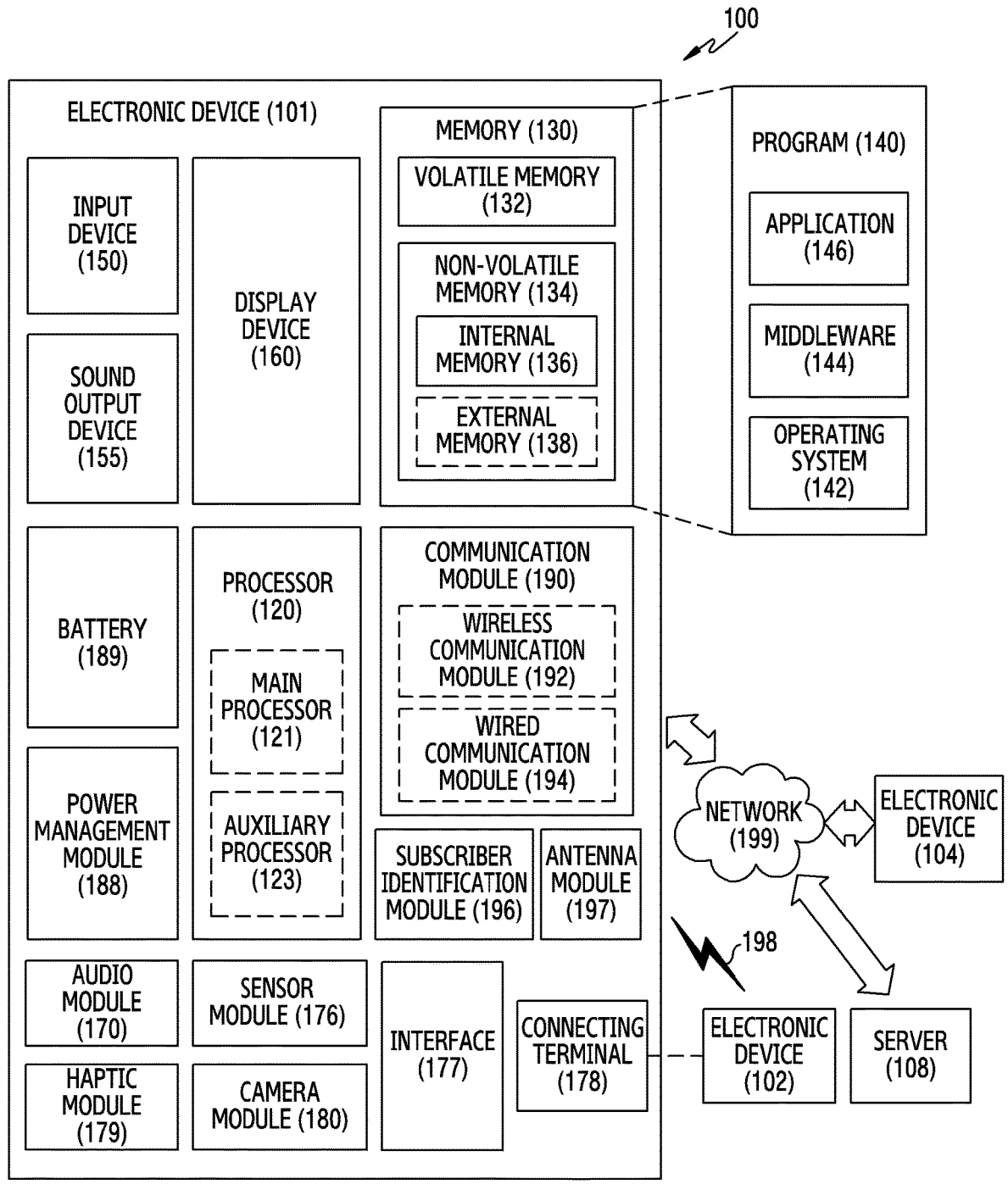
FIG. 1A is a block diagram of an electronic device in a network environment according to various embodiments.

FIG. 1A is a block diagram illustrating an electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
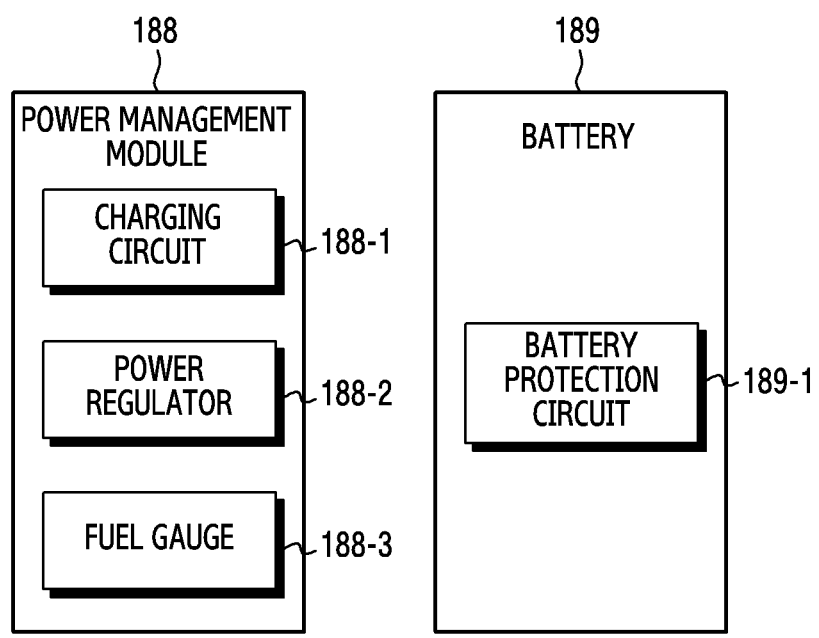
FIG. 1B is a block diagram 200 of a power management module 188 and a battery 189 according to various embodiments.

FIG. 1B is a block diagram 200 of a power management module 188 and a battery 189 according to various embodiments.

Referring to FIG. 1B, the power management module 188 may include a charging circuit 188-1, a power regulator 188-2, or a fuel gauge 188-3. The charging circuit 188-1 may charge the battery 189 with power supplied from an external power source of the electronic device 101. According to an embodiment, the charging circuit 188-1 may select a charging type (e.g., normal charging or rapid charging) based on at least some of the type of external power source (e.g., a power adapter, a USB, or wireless charging), the magnitude of power (e.g., about 20 W or more) capable of being supplied from the external power source, and the attributes of the battery 189, and may charge the battery 189 via the selected charging type. For example, the external power source may be connected in a wired manner via the connection terminal 178, or may be connected in a wireless manner via the antenna module 197.

The power regulator 188-2 may regulate the voltage level or the current level of the power supplied from the external power source or the battery 189 so as to generate a plurality of pieces of power having different voltages or different current levels. The power regulator 188-2 may regulate the power of the external power source or the power of the battery 189 to have a voltage or a current level appropriate for each of the components included in the electronic device 101. According to an embodiment, the power regulator 188-2 may be implemented in the form of a low drop out (LDO) regulator or a switching regulator.

The fuel gauge 188-3 may measure the use state information of the battery 189 (e.g., the capacity, voltage, or temperature of a battery, or the number of times that a battery is charged/discharged).

The power management module 188, for example, may determine charging state information related to charging of the battery 189 (e.g., battery life, overvoltage, low voltage, overcurrent, overcharging, overdischarge, overheating, a short circuit, or swelling) using the charger circuit 188-1, the power regulator 188-2, or the fuel gauge 188-3 based at least on the measured use state information, may determine whether the state of the battery 189 is an abnormal state or a normal state based at least on the determined charging state information, and may regulate charging of the battery 189 (e.g., decrease a charging current or voltage or suspend charging) if it is determined that the battery 189 is in an abnormal state. According to an embodiment, at least some of the functions of the power management module 188 may be performed by an external control device (e.g., the processor 120).

The battery 189 may include a battery protection circuit (protection circuit module (PCM)) 189-1 according to an embodiment. The battery protection circuit 189-1 may perform various functions (e.g., preemptive circuit interruption) in order to prevent deterioration in the performance of, or damage to, the battery 189. Additionally or alternatively (in alternative to), the battery protection circuit 189-1 may be configured as at least a part of a battery management system (BMS) for cell balancing, measuring the capacity of a battery, measuring the number of times that a battery has been charged/discharged, measuring a temperature, or measuring a voltage.

According to an embodiment, at least some of the use state information or the charging state information of the battery 189 may be measured using the fuel gauge 188-3, the power management module 188, or a corresponding sensor (e.g., a temperature sensor) of the sensor module 176. In this instance, according to an embodiment, the corresponding sensor (e.g., a temperature sensor) of the sensor module 176 may be included as a part of the battery protection circuit 140, or may be a device that is separate from the battery protection circuit 140 but is disposed close to the battery 189.

Figure 2:
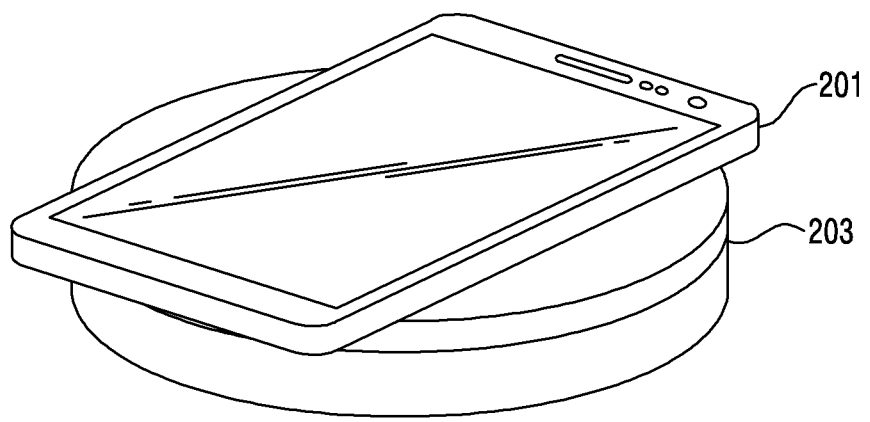
FIG. 2 is a diagram illustrating a wireless charging system according to various embodiments.

FIG. 2 is a diagram illustrating an example of a wireless charging system according to various embodiments.

Referring to FIG. 2, the wireless charging system may include an electronic device 201 (e.g., the electronic device 101) and a power transmission unit 203.

According to various embodiments, the electronic device 201 may detect the power transmission unit 203 based on a discovery signal (e.g., a ping signal) transmitted from the power transmission unit 203. For example, while the power transmission unit 203 operates in the standby mode, the power transmission unit 203 may periodically or aperiodically transmit a discovery signal in order to discover an electronic device that is to receive wireless power. If the electronic device 201 approaches the power transmission unit 203, the electronic device 201 may receive a discovery signal transmitted from the power transmission unit 203 and may detect the power transmission unit 203.

According to various embodiments, if the electronic device 201 receives a discovery signal from the power transmission unit 203, the electronic device 201 may determine whether to charge the battery of the electronic device 201 based on the state information associated with the electronic device 201. For example, at the point in time at which the electronic device 201 receives a discovery signal from the power transmission unit 203, if the temperature of at least a part of the electronic device 201 is greater than or equal to a reference temperature, the electronic device 201 may not transmit a response signal, so as not to charge the battery of the electronic device 201. As another example, at the point in time at which the electronic device 201 receives a discovery signal from the power transmission unit 203, if the voltage of the battery of the electronic device 201 is greater than or equal to a reference voltage (e.g., when the amount of charge remaining in the battery is greater than or equal to 95%), the electronic device 201 may not transmit a response signal, so as not to charge the battery of the electronic device 201. As another example, at the point in time at which the electronic device 201 receives a discovery signal from the power transmission unit 203, if the temperature of at least a part of the electronic device 201 is less than the reference temperature and the voltage of the battery of the electronic device 201 is less than the reference voltage, the electronic device 201 may transmit a response signal so as to charge the battery of the electronic device 201. In this instance, the power transmission unit 203 may be switched from the standby mode to a charging mode in response to reception of the response signal transmitted from the electronic device 201. The power transmission unit 203 may generate and transmit wireless power to the electronic device 201 while operating in the charging mode.

According to various embodiments, the electronic device 201 may suspend wireless charging based on the state information of the electronic device while receiving wireless power from the power transmission unit 203. For example, if the temperature of at least a part of the electronic device 201 reaches or exceeds a reference temperature while receiving wireless power from the power transmission unit 203, the electronic device 201 may suspend wireless charging. As another example, if the voltage of the battery of the electronic device 201 reaches or exceeds a reference voltage while receiving wireless power from the power transmission unit 203, the electronic device 201 may suspend wireless charging. The electronic device 201 may suspend wireless charging by deactivating at least a part of a wireless power reception circuit that receives wireless power from the power transmission unit 203.

According to various embodiments, if the electronic device 201 and the power transmission unit 203 are at least a predetermined distance away from each other in the state in which at least a part of the wireless power reception circuit of the electronic device 201 is deactivated, the electronic device 201 may reactivate at least the part of the wireless power reception circuit. For example, if a discovery signal is not received from the power transmission unit 203 during a predetermined period of time, the electronic device 201 may determine that the electronic device 201 is at least a predetermined distance away from the power transmission unit 203. The electronic device 201 may reactivate at least the part of the wireless power reception circuit that has been in the deactivated state.

Figure 3:
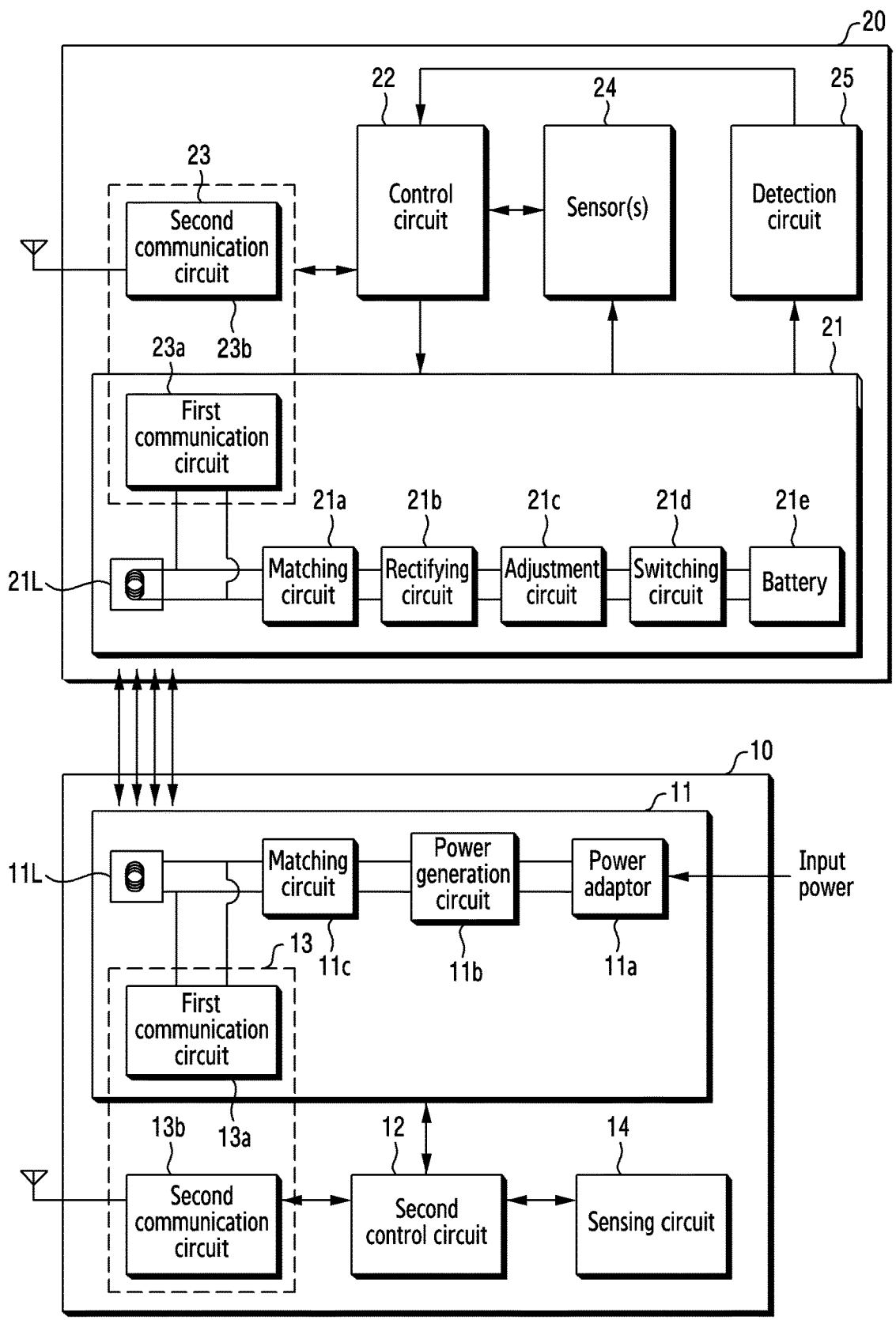
FIG. 3 is a diagram illustrating the configuration of a wireless power charging system according to various embodiments.

FIG. 3 is a diagram illustrating the configuration of a wireless power charging system according to various embodiments.

Referring to FIG. 3, according to an embodiment, a power transmission unit 10 (e.g., the power transmission unit 203) may include a power generation circuit 11, a control circuit 12, a communication circuit 13, and a sensing circuit 14.

According to various embodiments, the power generation circuit 11 may include a power adaptor 11*a* to receive a power source (or power) input from the outside and appropriately convert the voltage of the input power, a power generation circuit 11*b* to generate power, and a matching circuit 11*c* that maximizes efficiency between a transmission coil 11L and a reception coil 21L.

According to various embodiments, the control circuit 12 may perform overall control of the power transmission unit 10, may generate various messages needed for wireless power transmission, and may transfer the same to the communication circuit 13. According to an embodiment, the control circuit 12 may calculate the amount of power (or electric energy) to be transmitted to an electronic device 20 based on information received from the communication circuit 13. According to an embodiment, the control circuit 12 may control the power generation circuit 13 so that the calculated power is transmitted to the electronic device 20 via the transmission coil 11L.

According to various embodiments, the communication circuit 13 may include at least one of a first communication circuit 13a and a second communication circuit 13b. The first communication circuit 13a, for example, may communicate with a first communication circuit 23a of the electronic device 20 using the frequency band that is used when the transmission coil 11L transfers power (e.g., an in-band scheme). According to an embodiment, the second communication circuit 13b, for example, may communicate with a second communication circuit 23b of the electronic device 20 using a frequency different from the frequency that is used when the transmission coil 11L transfers power (e.g., an out-band scheme). For example, the second communication circuit 13b may obtain information related to a charging state (e.g., Vrec information, Iout information, various packets, messages, or the like) via the second communication circuit 23b from the electronic device 20 using one of various short-range communication schemes such as Bluetooth, BLE, Wi-Fi, and NFC.

In addition, the power transmission unit may further include a sensing circuit 14 or the like for sensing the temperature, movement, or the like of the power transmission unit.

According to various embodiments, the electronic device 20 (e.g., the electronic device 101) may include a wireless power reception circuit 21 (e.g., the power management module 188), a control circuit 22 (e.g., the processor 120), a communication circuit 23 (e.g., the communication module 190), at least one sensor 24 (e.g., the sensor module 176), and a display 25 (e.g., the display device 160). Regarding the electronic device 20, a description associated with the configuration corresponding to the power transmission unit 10 may be omitted.

According to various embodiments, the wireless power reception circuit 21 may include the reception coil 21L for receiving power from the power transmission unit 10 in the wireless manner, a matching circuit 21a, a rectifying circuit 21b for rectifying received AC power to DC power, an adjustment circuit 21c for adjusting a charging voltage, a switch circuit 21d, and/or a battery 21e (e.g., the battery 189).

According to various embodiments, the control circuit 22 may perform overall control of the electronic device 20, may generate various messages needed for wireless power transmission or reception, and may transfer the same to the communication circuit 23.

According to various embodiments, the communication circuit 23 may include at least one of the first communication circuit 23a and the second communication circuit 23b. The first communication circuit 23a may communicate with the power transmission unit 10 via the reception coil 21L. The second communication circuit 23b may communicate with the power transmission unit 10 using one of various short-range communication schemes such as Bluetooth, BLE, Wi-Fi, or NFC.

In addition, the electronic device 20 may further include at least one sensor 24, such as a current/voltage sensor, a temperature sensor, an illumination sensor, a sound sensor, and the like, a detection circuit 25, and the like.

According to various embodiments, the detection circuit 25 may detect a discovery signal or power received from the power transmission unit 10, and may detect the power transmission unit 10. For example, a signal may be generated in the reception coil 21L by a signal output from the power transmission unit 10. The detection circuit 25 may detect a change in a signal at an input end/output end of the rectifying circuit 21b, the matching circuit 21a, or the reception coil 21L, the change being caused by a signal generated in the reception coil 21L. According to various embodiments, the detection circuit 25 may be included in the reception circuit 21.

Figure 4:
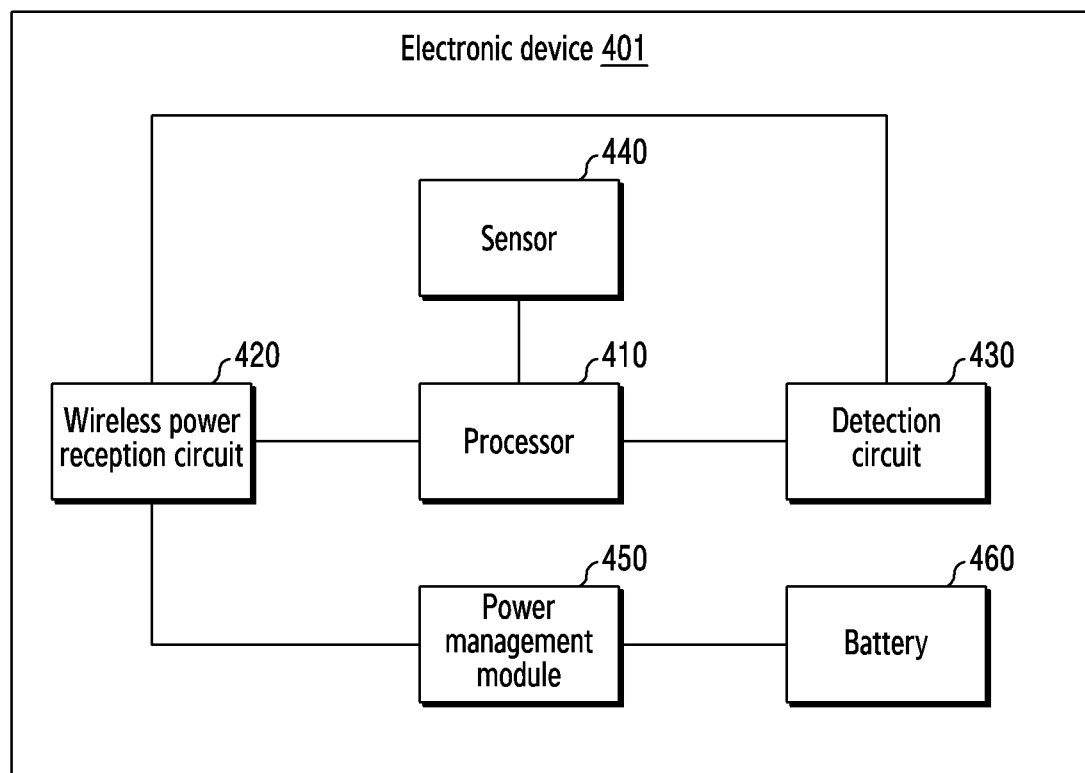
FIG. 4 is a block diagram of an electronic device according to various embodiments.

FIG. 4 is a block diagram of an electronic device according to various embodiments.

Referring to FIG. 4, an electronic device 401 (e.g., the electronic device 201) may include a processor 410 (e.g., the processor 120), a wireless power reception circuit 420 (e.g., the wireless power reception circuit 21), a detection circuit 430, a sensor 440 (e.g., the sensor 24), a power management module 450 (e.g., the power management module 188), and a battery 460 (e.g., the battery 189). According to an embodiment, the electronic device 401 may further include additional components in addition to the above-described components. For example, the electronic device 401 may further include a memory (not illustrated), a display (not illustrated), a communication circuit (not illustrated), and the like.

According to various embodiments, the processor 410 may control the overall operation of the electronic device 401. The processor 410 may be operably coupled with the wireless power reception circuit 420, the detection circuit 430, the sensor 440, the power management module 450, the battery 460, a memory (not illustrated) (e.g., the memory 130), and the like, in order to perform overall control of the electronic device.

According to various embodiments, the processor 410 may include a single processor core, or may include multiple processor cores. For example, the processor 410 may include multiple cores (multi-core), such as a dual-core processor, a quad-core processor, a hexa-core processor, and the like. According to an embodiment, the processor 410 may further include a cache memory that is located inside or outside the processor 410.

According to various embodiments, the processor 410 may receive commands from other components of the electronic device 401, may interpret a received command, and may perform a calculation or process data according to the interpreted command.

According to various embodiments, the processor 410 may process data or signals generated in the electronic device 401. For example, the processor 410 may request instructions, data, or signals from a memory (not illustrated). The processor 410 may record or update instructions, data, or signals under the control of the electronic device 401.

According to various embodiments, the processor 410 may include at least one processor. For example, the processor 410 may include one or more from among an application processor that controls a program in an upper layer, such as an application, a communication processor that controls functions related to communication, or an audio codec chip that controls encoding and decoding related to an audio signal.

According to various embodiments, the processor 410 may receive a discovery signal, which is transmitted from a power transmission unit (e.g., the power transmission unit 10), via the wireless power reception circuit 420. For example, if the electronic device is located a predetermined distance from a power transmission unit that operates in the standby mode, the processor 410 may receive a discovery signal transmitted from the power transmission unit that operates in the standby mode.

According to various embodiments, if a discovery signal is received, the processor 410 may transmit a response signal to the discovery signal based on state information of the electronic device. For example, the processor 410 may detect (identify) the temperature of at least apart (or at least some components) of the electronic device via the sensor 440 (e.g., a temperature sensor). If the temperature sensed by the sensor 440 is less than a reference temperature, the processor 410 may transmit a response signal to the discovery signal via a power reception unit circuit. If the temperature sensed by the sensor 440 is greater than or equal to the reference temperature, the processor 410 may deactivate at least a part of the wireless power reception circuit so as to restrict a response signal. As another example, the processor 410 may identify the voltage of the battery 460 via the power management module 450. If the voltage of the battery 460 is less than a reference voltage, the processor 410 may generate a response signal and may transmit the generated response signal via the power reception unit circuit. If the voltage of the battery 460 is greater than or equal to the reference voltage, the processor may deactivate at least a part of the wireless power reception circuit 420 so as to restrict a response signal. As another example, the processor 410 may sense the temperature of at least a part of the electronic device 401 via the sensor 440, and may identify the voltage of the battery 460 via the power management module 450. If the temperature identified using the sensor 440 is less than the reference temperature and the voltage of the battery 460 is less than the reference voltage, the processor 410 may broadcast a response signal to the discovery signal via the wireless power reception circuit 420. If the temperature identified using the sensor 440 is greater than or equal to the reference temperature or the voltage of the battery 460 is greater than or equal to the reference voltage, the processor 410 may deactivate at least a part of the wireless power reception circuit 420 so as to restrict a response signal. Here, the response signal may include information for switching an operation mode of the power transmission unit to a charging mode. If the response signal is received from the electronic device 401, the power transmission unit may switch from the standby mode to the charging mode. The power transmission unit may generate power via a power generation circuit (e.g., the power generation circuit 11) while operating in the charging mode.

According to various embodiments, the processor 410 may receive power from the power transmission unit (e.g., the power transmission unit 10). For example, the processor 410 may receive power generated by the power transmission unit via the wireless power reception circuit 420. According to various embodiments, the processor 410 may supply at least part of the received power to the battery 460 via the power management module 450 so as to charge the battery.

According to various embodiments, the processor 410 may restrict wireless charging based on the state information of the electronic device while receiving power from the power transmission unit (e.g., the power transmission unit 10). For example, the processor 410 may sense the temperature of at least a part of the electronic device using the sensor 440 while receiving power from the power transmission unit. If the sensed temperature is greater than or equal to a reference temperature, the processor 410 may deactivate at least part of the wireless power reception circuit 420 so as to restrict wireless charging. As another example, the processor 410 may receive information associated with the voltage of the battery 460 from the power management module 450 while receiving power from the power transmission unit. If the voltage of the battery 460 is greater than or equal to a reference voltage, the processor 410 may deactivate at least part of the wireless power reception circuit 420 so as to restrict wireless charging.

According to various embodiments, if the electronic device 401 and the power transmission unit (e.g., the power transmission unit 10) are at least a predetermined distance away from each other in the state in which at least a part of the wireless power reception circuit 420 is deactivated, the processor 410 may reactivate at least the part of the wireless power reception circuit. For example, if a discovery signal is not received from the power transmission unit during a predetermined period of time, the processor 410 may determine that the electronic device 401 is at least a predetermined distance away from the power transmission unit. The electronic device 201 may reactivate at least the part of the wireless power reception circuit 420, which has been in the deactivated state.

According to various embodiments, the wireless power reception circuit 420 may receive a discovery signal transmitted from the power transmission unit (e.g., the power transmission unit 10), and may transmit a response signal (e.g., a signal for switching the operation mode of the power transmission unit to the charging mode) to the discovery signal according to control of the processor 410.

According to various embodiments, the wireless power reception circuit 420 may receive generated power from the power transmission unit. For example, the wireless power reception circuit 420 may receive power from a transmission coil (e.g., the transmission coil 11L) of the power transmission unit via a reception coil (e.g., the reception coil 21L). The wireless power reception circuit 420 may provide the received power to the power management module 450. According to an embodiment, the wireless power reception circuit 420 may include a transmission coil, a matching circuit (e.g., the matching circuit 21a), a rectifying circuit (e.g., a rectifying circuit 21b), an adjustment circuit (e.g., the adjustment circuit 21c), a switching circuit (e.g., the switching circuit 21d), a communication circuit (e.g., a communication circuit (e.g., a first communication circuit 23a)), and the like.

According to various embodiments, the detection circuit 430 may detect a wireless power transmission unit based on a discovery signal received via the wireless power reception circuit 420. If the wireless power transmission unit is detected, the detection circuit 430 may provide information associated with the detection of the wireless power transmission unit to the processor 410. According to an embodiment, the detection circuit 430 may be a circuit separately designed to detect a wireless power transmission unit, or may include a watchdog timer to periodically check the state of the power transmission unit.

According to various embodiments, the sensor 440 may obtain state information of the electronic device 401. For example, the sensor 440 may periodically or aperiodically measure the temperature of at least a part (or at least some components) of the electronic device 401, and may provide information associated with the measured temperature to the processor 410.

According to various embodiments, the power management module 450 may supply the power of the battery to other components of the electronic device under the control of the processor 410, or may provide at least a part of the power received via the wireless power reception circuit to the battery 460 under the control of the processor 410. According to an embodiment, the power management module 450 may periodically or aperiodically obtain information associated with the voltage of the battery 460, and may provide the obtained information to the processor 410.

In the above description, the detection circuit 430 is illustrated as a separate component. However, according to various embodiments, the detection circuit 430 may be included in another component. For example, the detection circuit may be included in the processor 410 or the wireless power reception circuit 420.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device may include a wireless power reception circuit, and a processor, wherein the processor may be configured to: receive power transmitted from an external electronic device using the wireless power reception circuit; detect a state related to the reception while receiving the power; and when the state satisfies a designated condition, deactivate at least a part of the wireless power reception circuit so that the external electronic device suspends the transmission.

According to various embodiments, the electronic device may further include a temperature sensor configured to sense the temperature of at least a part of the electronic device, and the processor may be configured to identify the temperature of at least the part using the temperature sensor while receiving the power.

According to various embodiments, the processor may be configured to deactivate at least the part of the wireless power reception circuit if the temperature of at least the part is greater than or equal to a reference temperature.

According to various embodiments, the electronic device may further include a power management module, and the processor may be configured to obtain information associated with the voltage of a battery of the electronic device using the power management module while receiving the power.

According to various embodiments, the processor may be configured to deactivate at least a part of the wireless power reception circuit if the voltage of the battery is greater than or equal to a reference voltage.

According to various embodiments, the wireless power reception circuit further includes a communication circuit, and the processor may be configured to deactivate the communication circuit if the state satisfies the designated condition.

According to various embodiments, the electronic device may further include a detection circuit, configured to identify a signal provided from the external electronic device to the wireless power reception circuit so as to determine the state of the external electronic device, and the processor may be configured to detect the external electronic device based on state information received from the detection circuit.

According to various embodiments, the electronic device may further include a temperature sensor configured to identify the temperature of at least a part of the electronic device, and the processor may be configured to: obtain state information of the electronic device if the external electronic device is detected; deactivate at least a part of the wireless power reception circuit if temperature information received from the temperature sensor and the state information satisfy a designated first condition; and activate at least a part of the wireless power reception circuit if the temperature information and the state information satisfy a second condition.

According to various embodiments, the state information of the electronic device may be configured to include one or more selected from among the temperature of at least a part of the electronic device or the voltage of a battery of the electronic device.

According to various embodiments, an electronic device may include a wireless power reception circuit, a temperature sensor, and a processor, wherein the processor may be configured to: receive power transmitted from an external electronic device using the wireless power reception circuit; sense the temperature of at least a part of the electronic device using the temperature sensor while receiving the power; identify a state related to the reception based at least on the temperature; and if the state satisfies a designated condition, deactivate at least a part of the wireless power reception circuit.

According to various embodiments, the processor may be configured to determine that the state related to the reception satisfies the designated condition if the temperature is greater than or equal to a reference temperature.

According to various embodiments, the processor may be configured to identify the degree of misalignment between the electronic device and the external electronic device based at least on the temperature.

According to various embodiments, the wireless power reception circuit may further include a communication circuit, and the processor may be configured to deactivate the communication circuit if the state satisfies the designated condition.

According to various embodiments, the electronic device may further include a detection circuit to identify a signal provided from the external electronic device to the wireless power reception circuit so as to determine the state of the external electronic device, and the processor may be configured to detect the external electronic device based on state information received from the detection circuit.

According to various embodiments, the electronic device may further include a temperature sensor to sense the temperature of at least a part of the electronic device. In the case in which the external electronic device is detected, the processor may be configured to: obtain the state information of the electronic device via the detection circuit; deactivate at least a part of the wireless power reception circuit if the temperature information received from the temperature sensor and the state information satisfy a designated first condition; and activate at least a part of the wireless power reception circuit if the temperature information and the state information satisfy a designated second condition.

According to various embodiments, the state information of the electronic device may be configured to include one or more selected from among the temperature of at least a part of the electronic device or the voltage of the battery of the electronic device.

According to various embodiments, an electronic device may include: a temperature sensor, configured to sense the temperature of at least a part of the electronic device; a wireless power reception circuit, configured to receive power from an external electronic device; a detection circuit, configured to identify a signal provided from the external electronic device to the wireless power reception circuit so as to determine the state of the external electronic device; and a processor, wherein the processor may be configured to deactivate at least a part of the wireless power reception circuit if temperature information received from the temperature sensor and state information received from the detection circuit satisfy a designated first condition, and activate at least a part of the wireless power reception circuit if the temperature information and the state information satisfy a designated second condition.

According to various embodiments, the wireless power reception circuit may include a communication circuit, and the processor may be configured to deactivate the communication circuit if the temperature information received from the temperature sensor and the state information received from the detection circuit satisfy the designated first condition.

According to various embodiments, the processor may be configured to: receive power transmitted from the external electronic device via the activated wireless power reception circuit; detect the state related to reception; and deactivate at least a part of the wireless power reception circuit so that the external electronic device suspends transmission if the state satisfies the designated condition.

According to various embodiments, the processor may be configured to reactivate at least the part of the wireless power reception circuit if the electronic device is located at least a predetermined distance away from the power transmission unit after at least a part of the wireless power reception circuit is deactivated.

Figure 5:
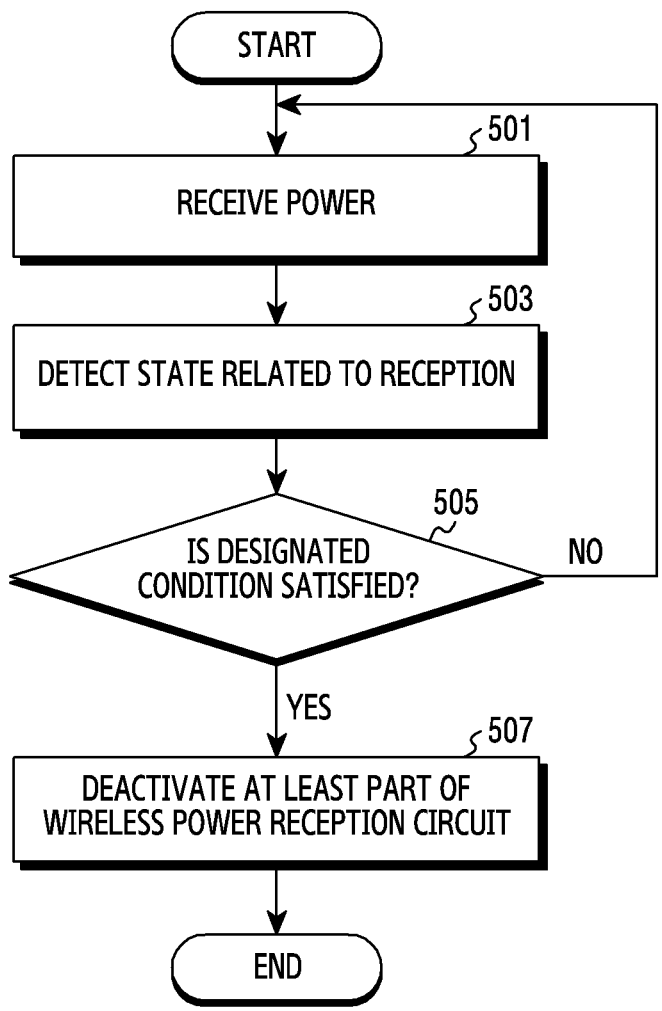
FIG. 5 is a flowchart illustrating an example of an electronic device that performs wireless charging according to various embodiments.

FIG. 5 is a flowchart illustrating an example of an electronic device that performs wireless charging according to various embodiments.

Referring to FIG. 5, in operation 501, a processor (e.g., the processor 410) of an electronic device (e.g., the electronic device 401) may receive power from a power transmission unit (e.g., the power transmission unit 10). For example, the processor may receive wireless power transmitted from the power transmission unit via a wireless power reception circuit (e.g., the wireless power reception circuit 420). The processor may supply the received wireless power to a battery via a power management module (e.g., the power management module 450) so as to perform wireless charging.

In operation 503, the processor may detect a state related to reception (state information of the electronic device). For example, the processor may identify the temperature of at least a part (or at least some components) of the electronic device via a sensor (e.g., the sensor 440) of the electronic device. As another example, the processor may identify the voltage of the battery of the electronic device via the power management module (e.g., the power management module 450). As another example, the processor may identify the temperature of at least a part of the electronic device via the sensor, and may identify the voltage of the battery of the electronic device via the power management module.

In operation 505, the processor may determine whether the state related to reception satisfies a designated condition. For example, if the temperature of at least a part of the electronic device is less than a reference temperature, the processor may determine that the state related to reception does not satisfy the designated condition. As another example, if the voltage of the battery is less than a reference voltage, the processor may determine that the state related to reception does not satisfy the designated condition. As another example, if the temperature of at least a part of the electronic device is greater than or equal to a reference temperature or the voltage of the battery of the electronic device is greater than or equal to a reference voltage, the processor may determine that the state related to reception satisfies the designated condition. If the state related to reception does not satisfy the designated condition in operation 505, the processor may perform operation 503 again to detect the state related to reception.

If the state related to reception satisfies the designated condition in operation 505, the processor may deactivate at least a part of the wireless power reception circuit (e.g., the wireless power reception circuit 420) of the electronic device in operation 507. Accordingly, if the temperature of at least a part of the electronic device is greater than or equal to a predetermined level, the electronic device may restrict a wireless charging function of the electronic device so as to prevent at least some components of the electronic device from being damaged by the heat generated by the wireless charging. Also, if the voltage of the battery is greater than or equal to a predetermined level, the electronic device may restrict the wireless charging function so as to effectively charge the battery.

Figure 6:
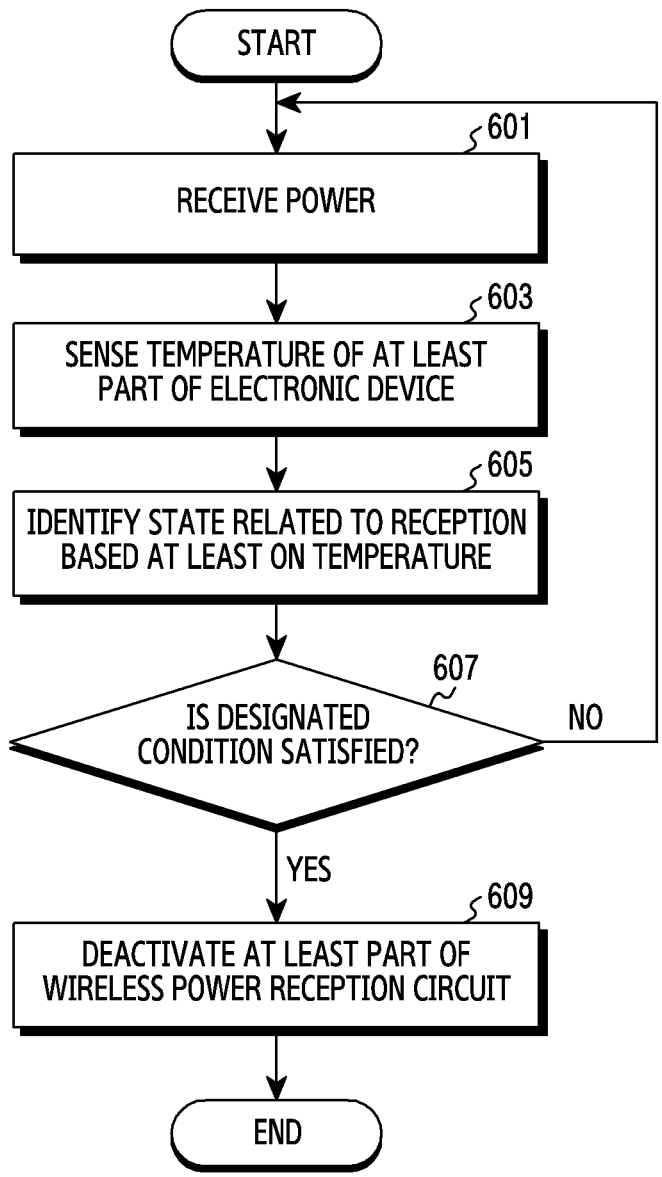
FIG. 6 is a flowchart illustrating another example of an electronic device that performs wireless charging according to various embodiments.

FIG. 6 is a flowchart illustrating another example of an electronic device that performs wireless charging according to various embodiments.

Referring to FIG. 6, in operation 601, a processor (e.g., the processor 410) of an electronic device (e.g., the electronic device 401) may receive power from a power transmission unit (e.g., the power transmission unit 10). For example, if the electronic device approaches the power transmission unit, the processor may receive power (e.g., wireless power) transmitted from the power transmission unit via a wireless power reception circuit (e.g., the wireless power reception circuit 420). The processor may supply the received power to a battery via a power management module (e.g., the power management module 450) so as to perform wireless charging.

In operation 603, the processor may sense the temperature of at least a part of the electronic device via a sensor (e.g., the sensor 440). For example, the processor may sense (identify) the temperature of at least one part inside the housing of the electronic device (or the temperature of at least one component disposed in the housing of the electronic device) via the sensor while the electronic device performs wireless charging. Here, the sensor may periodically or aperiodically sense a temperature, and may provide the same to the processor.

In operation 605, the processor may identify a state related to reception based at least on the sensed temperature. For example, the processor may identify whether the electronic device is capable of performing wireless charging based on the temperature of at least a part of the electronic device. For example, if the temperature of at least a part of the electronic device is greater than or equal to a reference temperature, the processor may identify that the electronic device is incapable of performing wireless charging. According to an embodiment, the processor may identify the degree of misalignment (misalign) between the electronic device and the power transmission unit based at least on the sensed temperature. Here, the degree of misalignment between the electronic device and the power transmission unit may indicate the degree to which a reception coil (e.g., the reception coil 21L) included in the wireless power reception circuit (e.g., the wireless power reception circuit 21) of the electronic device is misaligned with a transmission coil (e.g., the transmission coil 11) included in a power generation circuit (e.g., the power generation circuit 11) of the power transmission unit.

In operation 607, the processor may determine whether the identified state satisfies a designated condition. For example, if the electronic device is incapable of performing wireless charging, the processor may determine that the identified state satisfies the designated condition. If the identified state does not satisfy the designated condition in operation 607, the processor may proceed with operation 603 of sensing the temperature of at least a part of the electronic device.

If the identified state satisfies the designated condition in operation 607, the processor may deactivate at least a part of the wireless power reception circuit in operation 609. For example, if the electronic device is incapable of performing wireless charging, the processor may deactivate at least a part of the wireless power reception circuit. Accordingly, the electronic device may identify the degree to which the electronic device is misaligned with the power transmission unit based on a temperature, and may suspend the wireless charging operation of the electronic device depending on the degree of misalignment so as to prevent at least some components of the electronic device from being damaged by heat generated by wireless charging.

Figure 7:
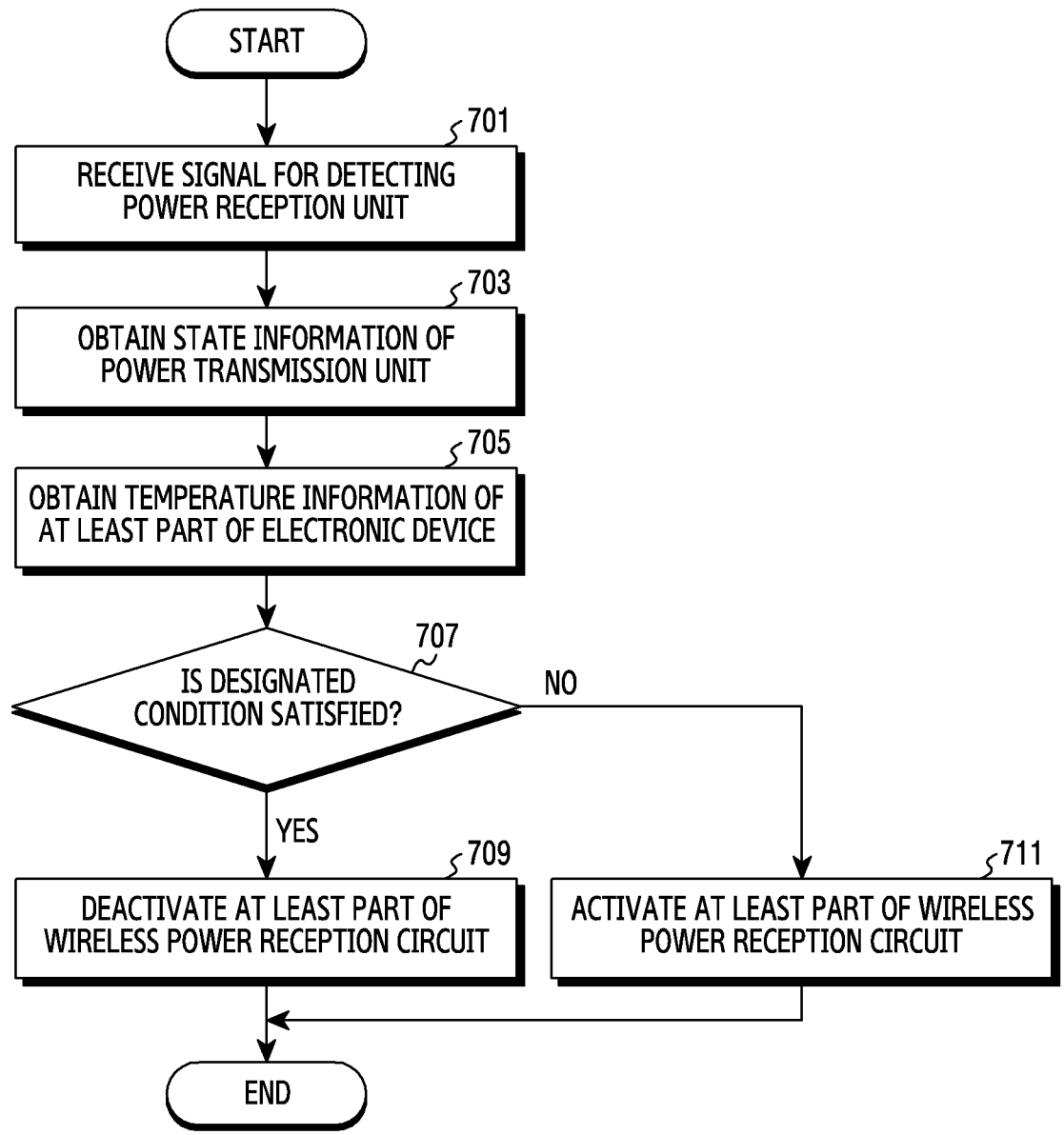
FIG. 7 is a flowchart illustrating another example of an electronic device that performs wireless charging according to various embodiments.

FIG. 7 is a flowchart illustrating another example of an electronic device that performs wireless charging according to various embodiments.

Referring to FIG. 7, in operation 701, a processor (e.g., the processor 410) of an electronic device (e.g., the electronic device 401) may receive a signal for detecting a power reception unit, which is broadcasted from a power transmission unit (e.g., the power transmission unit 10), via a wireless power reception circuit (e.g., the wireless power reception circuit 420). For example, the power transmission unit may periodically or aperiodically transmit a discovery signal for detecting a power reception unit while operating in the standby mode. If the electronic device is located within a predetermined distance from the power transmission unit, the processor may receive a discovery signal transmitted from the power transmission unit via the wireless power reception circuit.

In operation 703, the processor may obtain state information of the power transmission unit based on the received signal. For example, if the discovery signal is received, the processor may obtain information indicating that the power transmission unit operates in the standby mode via a detection circuit.

In operation 705, the processor may obtain temperature information associated with at least a part of the electronic device. For example, the processor may obtain the temperature of at least one component included in the housing or the temperature of a predetermined part inside (or outside) the housing via a temperature sensor (e.g., the sensor 440).

In operation 707, the processor may determine whether the obtained state information and temperature information satisfy a designated condition. For example, if the power transmission unit operates in the standby mode and the temperature of at least a part of the electronic device is greater than or equal to a reference temperature, the processor may determine that the designated condition is satisfied. As another example, although the power transmission unit operates in the standby mode, if the temperature of at least a part of the electronic device is less than the reference temperature, the processor may determine that the designated condition is not satisfied.

If the obtained state information and temperature information satisfy the designated condition in operation 707, the processor may deactivate at least a part of the wireless power reception circuit in operation 709. For example, the processor may deactivate a communication circuit (e.g., the first communication circuit 23a) of the wireless power reception circuit, and may restrict a response signal to the discovery signal from the power transmission unit. The power transmission unit may not receive a response signal, and may continue to operate in the standby mode. Accordingly, the electronic device may restrict a wireless charging function depending on the temperature of at least a part of the electronic device, so as not to perform the wireless charging function, and thus may decrease the amount of heat generated during wireless charging. Also, the electronic device may restrict an unnecessary wireless charging function depending on the amount of charge remaining in the battery (e.g., the battery 460) of the electronic device, so as to efficiently charge the battery. According to an embodiment, if the electronic device is at least a predetermined distance away from the power transmission unit after at least a part of the wireless power reception circuit is deactivated, the processor may reactivate at least the part of the wireless power reception circuit. For example, if a discovery signal is not received during a predetermined period of time from the power transmission unit in the state in which at least a part of the wireless power reception circuit is deactivated, the processor may determine that the electronic device is at least a predetermined distance away from the power transmission unit, and may activate at least the part of the wireless power reception circuit again.

If the obtained state information and temperature information do not satisfy the designated condition, the processor may activate at least the part of the wireless power reception circuit in operation 711. For example, the processor may activate at least the part of the wireless power reception circuit, and may receive power from the power transmission unit. In this instance, the processor may provide power to the battery of the electronic device via the power management module (e.g., the power management module 450).

In the above description, it is illustrated that the electronic device determines whether to activate the wireless power reception circuit by taking into consideration state information of the power transmission unit and temperature information associated with at least a part of the electronic device. However, according to various embodiments, the electronic device may use other information, in addition to the above-mentioned information. For example, the electronic device may additionally use information associated with the voltage of the battery of the electronic device in order to determine whether to activate the wireless power reception circuit.

According to various embodiments, an operation method of an electronic device may include: receiving power transmitted from an external electronic device using a wireless power reception circuit of the electronic device; detecting a state related to the reception while receiving the power; and deactivating at least a part of the wireless power reception circuit so that the external electronic device suspends transmission if the state satisfies a designated condition.

According to various embodiments, the operation of detecting the state related to reception may further include identifying the temperature of at least a part of the electronic device using a temperature sensor of the electronic device while receiving the power.

According to various embodiments, the operation of deactivating at least a part of the wireless power reception circuit may include deactivating at least the part of the wireless power reception circuit if the temperature of at least the part is greater than or equal to a reference temperature.

According to various embodiments, the operation of detecting the state related to the reception may further include obtaining information associated with the voltage of a battery of the electronic device using a power management module of the electronic device while receiving the power.

According to various embodiments, the operation of deactivating at least a part of the wireless power reception circuit may include deactivating at least a part of the wireless power reception circuit if the voltage of the battery is greater than or equal to a reference voltage.

According to various embodiments, the operation of deactivating at least a part of the wireless power reception circuit may include deactivating a communication circuit of the wireless power reception circuit if the state satisfies the designated condition.

According to various embodiments, the operation method of the electronic device may further include detecting the external electronic device based on state information of the external electronic device received from a detection circuit of the electronic device.

According to various embodiments, the operation method of the electronic device may include: obtaining state information of the electronic device if the external electronic device is detected; deactivating at least a part of the wireless power reception circuit if temperature information received from the temperature sensor and the state information satisfy a designated first condition; and activating at least a part of the wireless power reception circuit if the temperature information and the state information satisfy a second condition.

According to various embodiments, the state information of the electronic device may be configured to include one or more from among the temperature of at least a part of the electronic device or the voltage of a battery of the electronic device.

According to various embodiments, the operation method of the electronic device may include: receiving power from an external electronic device using a wireless power reception circuit of the electronic device; sensing the temperature of at least a part of the electronic device using a temperature sensor of the electronic device while receiving the power; identifying a state related to the reception based at least on the temperature; and deactivating at least a part of the wireless power reception circuit if the state satisfies a designated condition.

According to various embodiments, the operation method of the electronic device may further include determining that the state related to the reception satisfies the designated condition if the temperature is greater than or equal to a reference temperature.

According to various embodiments, the operation method of the electronic device may further include identifying the degree of misalignment between the electronic device and the external electronic device based at least on the temperature.

According to various embodiments, the operation of deactivating at least a part of the wireless power reception circuit may include deactivating a communication circuit of the wireless power reception circuit if the state satisfies the designated condition. According to various embodiments, the operation method of the electronic device may include detecting the external electronic device based on state information of the external electronic device received from a detection circuit of the electronic device.

According to various embodiments, the operation method of the electronic device may further include: sensing the temperature of at least a part of the electronic device via a temperature sensor of the electronic device; obtaining state information of the electronic device via the detection circuit; deactivating at least a part of the wireless power reception circuit if temperature information received from the temperature sensor and the state information satisfy a designated first condition; and activating at least a part of the wireless power reception circuit if the temperature information and the state information satisfy a second condition.

According to various embodiments, the state information of the electronic device may be configured to include one or more from among the temperature of at least a part of the electronic device or the voltage of a battery of the electronic device.

According to various embodiments, the operation method of the electronic device may include: deactivating at least a part of the wireless power reception circuit of the electronic device if temperature information received from a temperature sensor of the electronic device and state information received from a detection circuit of the electronic device satisfy a designated first condition; and activating at least a part of the wireless power reception circuit if the temperature information and the state information satisfy a second condition.

According to various embodiments, the operation of deactivating at least a part of the wireless power reception circuit of the electronic device may include deactivating the communication circuit if the temperature information received from the temperature sensor and the state information received from the detection circuit satisfy the designated first condition.

According to various embodiments, the operation method of the electronic device may further include: receiving power transmitted from the external electronic device via the activated wireless power reception circuit; detecting a state related to reception while receiving the power; and deactivating at least a part of the wireless power reception circuit so that the external electronic device suspends transmission if the state satisfies the designated condition.

According to various embodiments, the operation method of the electronic device may further include: reactivating at least a part of the wireless power reception circuit if the electronic device is at least a predetermined distance away from the power transmission unit after at least the part of the wireless power reception circuit is deactivated.

The disclosure has been described above by way of exemplary embodiments. Those skilled in the art will appreciate that various modifications and changes may be made without departing from the essential scope and spirit of the disclosure. Therefore, the embodiments disclosed herein should be considered not from limitative viewpoints but from illustrative viewpoints. The scope of the disclosure should be determined not by the above description but by the appended claims, and all differences equivalent to the claims shall be construed as falling within the scope of the disclosure.

What is claimed is:

1. An electronic device, comprising:
    a wireless power reception circuit;
    a detection circuit;
    a temperature sensor; and
    a processor,
    wherein the processor is configured to:
    detect, via the temperature sensor, a temperature of at least a part of the electronic device;
    determine, via the detection circuit, a state of an external electronic device; and
    when the temperature is greater than or equal to a reference temperature and the state of the external electronic device is a standby state in which the external electronic device transmits a signal for detecting the electronic device, deactivate at least a part of the wireless power reception circuit to stop receiving wireless power from the external electronic device.

2. The electronic device of claim 1, further comprising: a power management module,
    wherein the processor is configured to obtain information associated with a voltage of a battery of the electronic device using the power management module.

3. The electronic device of claim 2, wherein the processor is configured to deactivate at least a part of the wireless power reception circuit if the voltage of the battery is greater than or equal to a reference voltage.

4. The electronic device of claim 1, wherein the wireless power reception circuit further comprises a communication circuit, and
    wherein the processor is configured to deactivate the communication circuit if the state satisfies a designated condition.

5. The electronic device of claim 1,
    wherein the detection circuit is configured to identify the signal provided from the external electronic device to the wireless power reception circuit so as to determine the state of the external electronic device,
    wherein the processor is configured to detect the external electronic device based on state information received from the detection circuit.

6. The electronic device of claim 5,
    wherein the processor is configured to:
    obtain state information of the electronic device if the external electronic device is detected;
    deactivate at least a part of the wireless power reception circuit if temperature information received from the temperature sensor and the state information satisfy a designated first condition; and
    activate at least a part of the wireless power reception circuit if the temperature information and the state information satisfy a designated second condition.

7. The electronic device of claim 6, wherein the state information of the electronic device is configured to include one or more from among a temperature of at least a part of the electronic device or a voltage of a battery of the electronic device.

8. An operation method of an electronic device, the method comprising:
    detecting, via a temperature sensor of the electronic device, a temperature of at least a part of the electronic device;
    detecting, via a detection circuit of the electronic device, a state of an external electronic device; and when the temperature is greater than or equal to a reference temperature and the state of the external electronic device is a standby state in which the external electronic device transmits a signal for detecting the electronic device, deactivating at least a part of the wireless power reception circuit to stop receiving wireless power from the external electronic device.

9. The method of claim 8, further comprising:
obtaining information associated with a voltage of a battery of the electronic device using a power management module of the electronic device while receiving the power.

10. The method of claim 9, wherein the deactivating at least a part of the wireless power reception circuit comprises:
deactivating at least a part of the wireless power reception circuit if the voltage of the battery is greater than or equal to a reference voltage.

11. The method of claim 8, wherein the deactivating at least a part of the wireless power reception circuit comprises:
deactivating a communication circuit of the wireless power reception circuit if the state satisfies a designated condition.

* * * * *